L. McCORMICK.
METHOD OF AND APPARATUS FOR DISPLAYING PICTURES.
APPLICATION FILED SEPT. 20, 1915.
1,230,188.
Patented June 19, 1917.
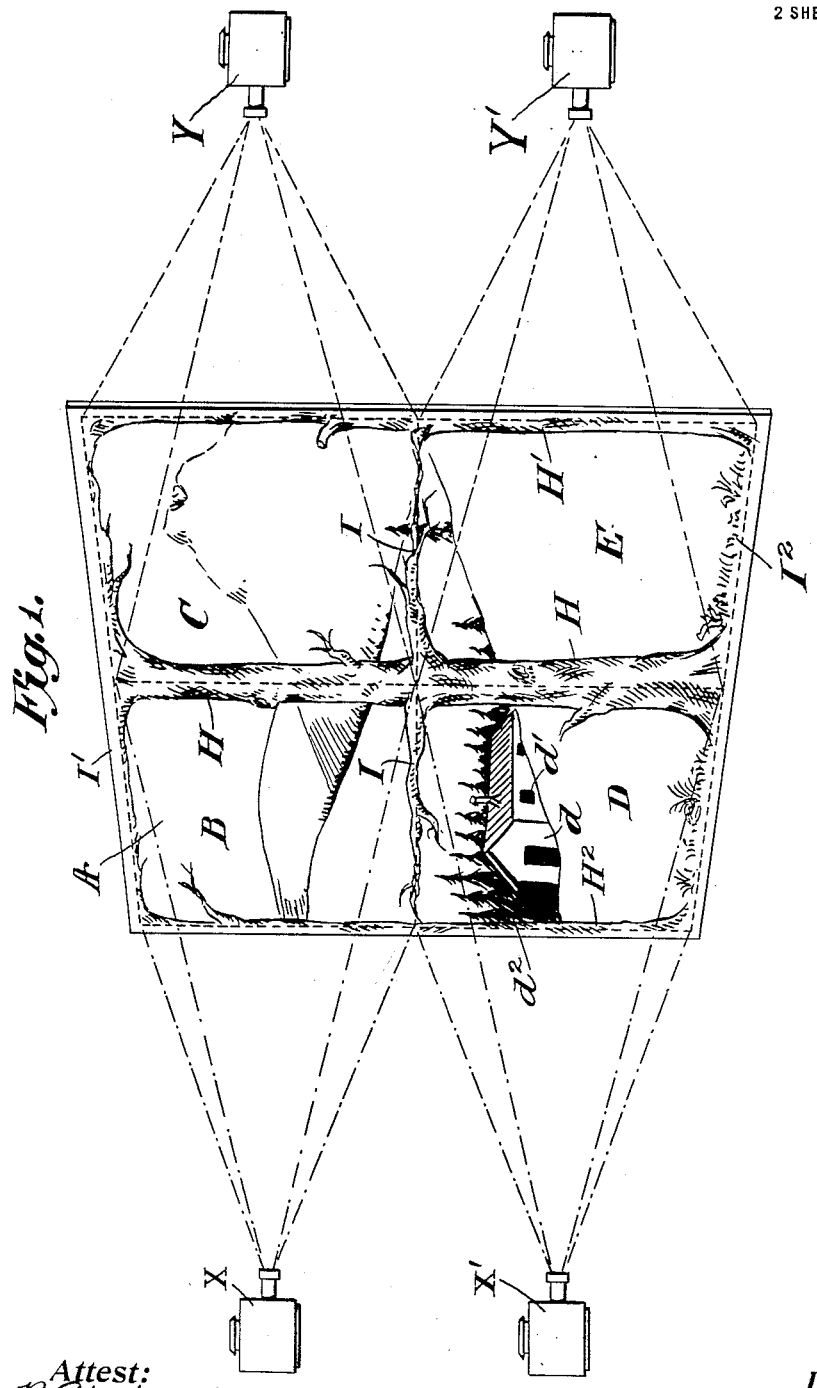
Inventor:
LANGDON McCORMICK

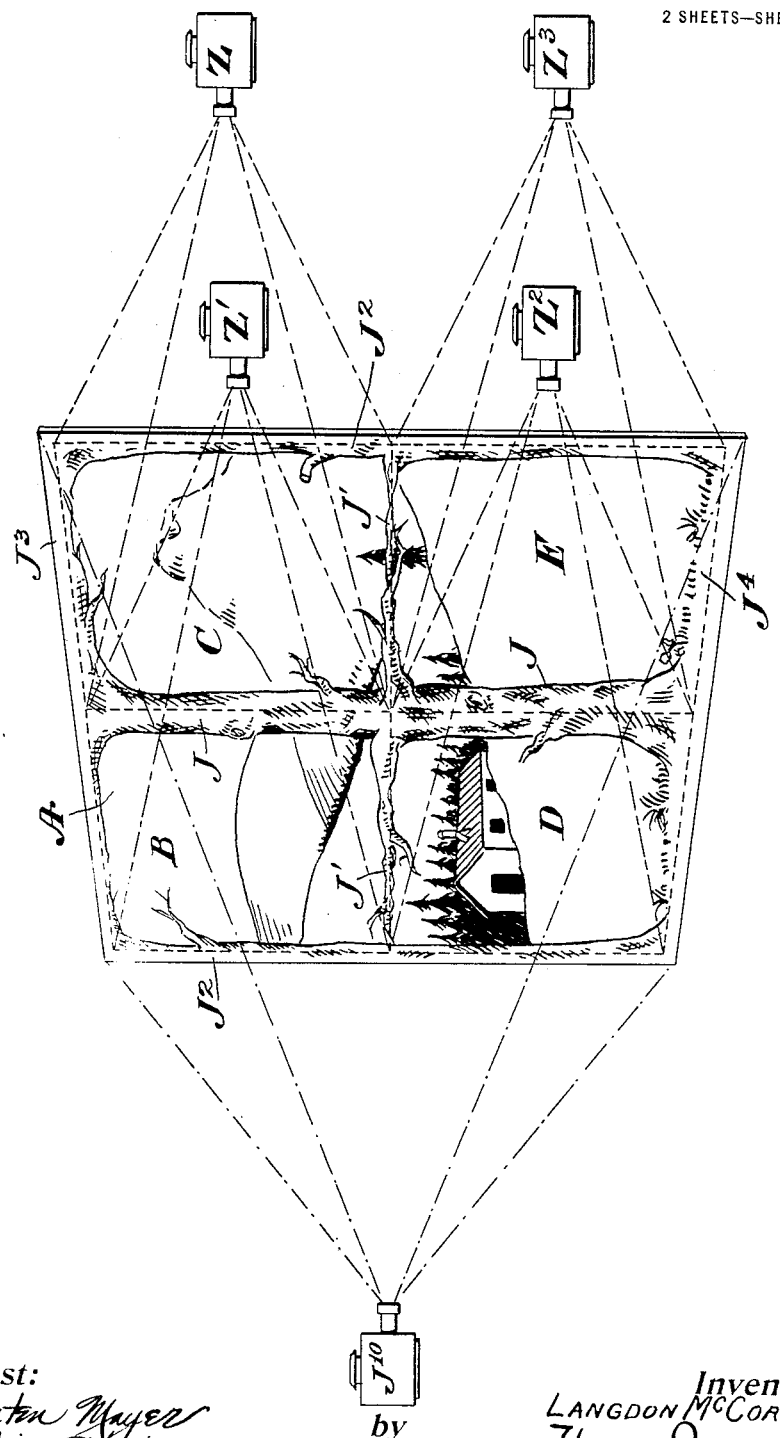

UNITED STATES PATENT OFFICE.

LANGDON McCORMICK, OF NEW YORK, N. Y.

METHOD OF AND APPARATUS FOR DISPLAYING PICTURES.

1,230,188. Specification of Letters Patent. Patented June 19, 1917.

Application filed September 20, 1915. Serial No. 51,709.

*To all whom it may concern:*

Be it known that I, LANGDON McCORMICK, a citizen of the United States of America, residing in the city, county, and State of New York, have invented a new and useful Method of and Apparatus for Displaying Pictures; and I do hereby declare the following to be a full, clear, and exact description of the same.

This invention relates to displaying pictures, especially consecutive-view or moving pictures, onto a screen.

The object of my invention is to employ a screen having its surface divided into a plurality of exhibition-fields, onto any or all of which pictures may be displayed. This permits the employment of a screen much larger than heretofore used, and the displaying of pictures of unusual size.

A second object of the invention is to employ a picture-element as the means for dividing the screen surface, this element intentionally appearing as part of the displayed picture.

A third object of the invention is to project a representation of the picture-element onto the screen by a light-projecting device.

A fourth object of the invention is to simultaneously project several pictures or picture-portions, of the same or of different colors, onto the same screen, causing the pictures or portions to interfit as a single picture.

A fifth object of the invention is to simultaneously project pictures or picture-portions, to interfit, onto opposite sides of the screen.

Referring to the accompanying drawings, Figure 1 illustrates a screen divided into a plurality of exhibition-fields by means of a picture element carried by the screen; Fig. 2 shows the employment of a light-projecting means for projecting a representation of a picture element onto the screen.

It is possible, by the employment of my method, to utilize a screen of very large size, and thus to display pictures covering a greater area than heretofore used. Whatever its size, the screen A may have a plurality of exhibition-fields (as B, C, D, E), the division of the screen into fields being due to use of a picture element, such as the representation of a tree, with the trunk H constituting the vertical dividing line, and with the limbs, I, I, constituting the horizontal dividing lines. Each field may be further framed, if desired, by representations of other tree-trunks, H′, branches I′, and grass I², or otherwise.

The divisional picture-element or picture-elements may be painted on or otherwise incorporated with the screen, or may be permanently or removably fitted thereto or thereon. It may have any form or appearance desired or predetermined.

Instead of being formed on, attached to, or arranged near the screen, the picture element may be a mere representation projected onto the screen. Fig. 2 illustrates the employment of a lantern or projectoscope $J^{10}$, for displaying or throwing a representation of a dividing picture element upon the screen. The projected or displayed element may comprise the upright (a tree trunk, J), cross-arms (branches J′, J′) and side and top framing-members (tree-trunks $J^2$, upper branches $J^3$ and grass patches $J^4$).

The several fields (as B, C, D, E) provided by dividing the screen surface, may each be used for the displaying of pictures. A separate machine will usually be employed for each field—thus machine X may throw pictures on field B, machine X′ may throw pictures on field D, machine Y may throw pictures on field C, and machine Y′ may throw pictures on field E. The various machines may be relatively arranged in any manner. Some of the machines (as X and X′) may be located before the screen and project pictures onto the front thereof, and the remaining machines (as Y and Y′) will be located behind and project pictures onto the back of the screen; or all picture-projecting machines (as Z, Z′, $Z^2$, $Z^3$, in Fig. 2) may be at the same side of the screen and throw the pictures onto the several fields of the same surface.

The entire screen surface, or any of the fields, may be treated, if desired, so as to modify the appearance of a picture displayed thereon, as especially described in an application Serial No. 51,708 filed of even date herewith. As an instance, the screen shown in Fig. 1, may have opaque portions (such as the representations of the mountains on the field B and C, and the tree-trunk and branches, H and I) and transparent portions. The latter will be especially useful when the pictures are projected onto both surfaces of the screen.

Each exhibition field (as B, C, D or E) of a screen may be as large or larger than the field ordinarily heretofore used, and this will enable the projection of large (even gigantic) pictures, made up of adjacent pictures. With the arrangement of fields illustrated in Fig. 1 or Fig. 2, it is possible to display a picture four times as large as those heretofore displayed.

Pictures may be displayed on the various fields simultaneously or successively.

While I have shown each projecting machine, as displaying upon a single field, it will be understood that two or more machines may simultaneously or independently project pictures or picture-elements onto the same field. As one instance, a front machine X may project pictures (consecutive-view or others) toward and onto the front of field B or C (or both), while rear machine Y projects pictures onto the rear of the same field; in such case, the pictures projected by Y may represent night, sky, cloud or storm effects, and be of a color or shade contrasting with the pictures projected by machine X. As another instance, a front machine X' may throw the illustrated picture, including a cabin and trees, onto the front surface of the field D, and—at a desired time—a rear machine (as Y') may forwardly project a colored picture or picture element to apparently light the cabin door ($d$) and window ($d'$), or to so color the trees ($d^2$) as to represent flames.

The operation, control or picture-projection of any or all of the several projecting machines may be effected in any desired manner and by any desired means.

The hereinbefore mentioned divisional picture element, whether the applied one of Fig. 1 or the projected one of Fig. 2, may have its appearance modified during the use of the screen, as, in one instance, between the projection of pictures illustrating different subjects, or during the projection of the successive pictures illustrating the same subject, thus changing the appearance of the latter. Thus the divisional picture element (whether actually on or projected onto the screen) may seem to be made smaller, larger or to differ in shape. For this purpose, mechanical or other means—for instance on a slide or a film, or partly made up of a slide or a film—may be interposed at any position between the lens and the screen.

While I have hereinbefore described several ways of practising my new method, and some arrangements of apparatus useful therewith, it will be understood that my invention is not limited to such ways or arrangements.

What I claim is:

1. The method of projecting pictures, which consists in projecting a plurality of pictures on different portions of a screen surface, and providing a picture element between said portions of the screen surface to serve as a division for said portions and to merge into the plurality of projected pictures for forming therewith a composite picture.

2. A screen for the projection of pictures, comprising a screen surface and a permanent picture element thereon for dividing the same into a plurality of exhibition fields.

3. A screen for the projection of pictures, comprising a screen surface and a picture element thereon for dividing the same into sections each adapted to receive a projected picture.

In testimony whereof, I have signed my name to this specification in the presence of two subscribing witnesses.

LANGDON McCORMICK.

Witnesses:
ISAAC HYMAN,
PETER S. RYAN.